US009176020B2

(12) United States Patent
Dawson et al.

(10) Patent No.: US 9,176,020 B2
(45) Date of Patent: Nov. 3, 2015

(54) PRESSURE SENSOR HAVING MULTIPLE PRESSURE CELLS AND SENSITIVITY ESTIMATION METHODOLOGY

(71) Applicant: FREESCALE SEMICONDUCTOR, INC., Austin, TX (US)

(72) Inventors: Chad S. Dawson, Queen Creek, AZ (US); Peter T. Jones, Scottsdale, AZ (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 107 days.

(21) Appl. No.: 14/043,556

(22) Filed: Oct. 1, 2013

(65) Prior Publication Data

US 2015/0090052 A1 Apr. 2, 2015

(51) Int. Cl.

*G01L 1/12* (2006.01)
*G01L 25/00* (2006.01)
*G01L 1/04* (2006.01)
*G01L 1/14* (2006.01)

(52) U.S. Cl.

CPC . *G01L 25/00* (2013.01); *G01L 1/04* (2013.01); *G01L 1/148* (2013.01)

(58) Field of Classification Search

CPC .......................... G01R 27/2605; G01N 27/221
USPC .................................... 73/780, 777, 862.626
See application file for complete search history.

(56) References Cited

U.S. PATENT DOCUMENTS

| | | | | |
|---|---|---|---|---|
| 4,993,266 | A * | 2/1991 | Omura et al. | 73/720 |
| 7,043,960 | B1 | 5/2006 | Lueck | |
| 7,238,238 | B2 * | 7/2007 | Iwata | 118/664 |
| 7,673,519 | B1 | 3/2010 | Fuhrmann et al. | |
| 2003/0015040 | A1 * | 1/2003 | Ishio et al. | 73/718 |
| 2007/0095146 | A1 | 5/2007 | Brosh | |
| 2008/0030205 | A1 * | 2/2008 | Fujii et al. | 324/661 |
| 2012/0024075 | A1 * | 2/2012 | Peng | 73/724 |

FOREIGN PATENT DOCUMENTS

WO 2010054676 A1 5/2010

OTHER PUBLICATIONS

Infineon, Pressure Sensor in Automotive Applications, Jun. 6, 2011, Infineon Technologies 2011.

* cited by examiner

*Primary Examiner* — Max Noori

(57) ABSTRACT

A pressure sensor (20) includes a test cell (32) and sense cell (34). The sense cell (34) includes an electrode (42) formed on a substrate (30) and a sense diaphragm (68) spaced apart from the electrode (42) to produce a sense cavity (64). The test cell (32) includes an electrode (40) formed on the substrate (30) and a test diaphragm (70) spaced apart from the electrode (40) to produce a test cavity (66). Both of the cells (32, 34) are sensitive to pressure (36). However, a critical dimension (76) of the sense diaphragm (68) is less than a critical dimension (80) of the test diaphragm (70) so that the test cell (32) has greater sensitivity (142) to pressure (36) than the sense cell (34). Parameters (100) measured at the test cell (32) are utilized to estimate a sensitivity (138) of the sense cell (34).

5 Claims, 3 Drawing Sheets

RELATIONSHIP BETWEEN SENSITIVITY AND GEOMETRY OF PRESSURE CELL (SENSE CELL AND TEST CELL)

133 124 128 132 134

136 $SENS = F(W) * G(D) * H(T)$

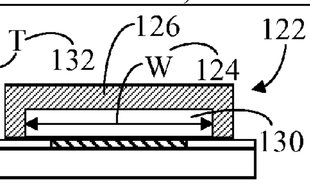

138 76 128 132 142

$SENS_1 = F(W) * G(D) * H(T)$ 140 $SENS_2 = F(W+\omega) * G(D) * H(T)$ 80

DERIVATION OF SENSE CELL SENSITIVITY RELATIVE TO TEST CELL SENSITIVITY $\frac{SENS_2}{F(W+\omega)} = G(D) * H(T)$ ← 144 (128, 132, 80, 140)

$SENS_1 = F(W) * \frac{SENS_2}{F(W+\omega)}$ ← 146 (138, 76, 80)

$SENS_1 = SENS_2 * \frac{F(W)}{F(W+\omega)}$ ← 148 (138, 142, 76, 80)

BY DEFINITION: 138 36 150 152 100 142 36

98 $C_{S1} = SENS_1 * P + ZPO_1$ $C_{S2} = SENS_2 * P + ZPO_2$

WHERE ZPO IS ZERO PRESSURE OFFSET, AND $ZPO_2 = ZPO_1$

COMBINE AND REARRANGE CAPAITANCE EQUATIONS TO DERIVE SENSITIVITY EQUATION FOR TEST CELL:

142 $SENS_2 = \frac{C_{S2} - C_{S1} + SENS_1 * P}{P}$ ← 154 (100, 98, 36, 138)

COMBINE SENSITIVITY EQUATION FOR TEST CELL WITH EQUATION FOR SENSITIVITY OF SENSE CELL:

138 $SENS_1 = \frac{C_{S2} - C_{S1} + SENS_1 * P}{P} * \frac{F(W)}{F(W+\omega)}$ ← 156 (100, 98, 36, 138, 76, 80)

SOLVING FOR SENSITIVITY OF SENSE CELL:

138 $SENS_1 = \frac{\frac{F(W)}{F(W+\omega)}\left[\frac{C_{S2} - C_{S1}}{P}\right]}{1 - \frac{F(W)}{F(W+\omega)}}$ ← 158 (76, 80, 100, 98, 36)

PRESSURE SENSOR HAVING MULTIPLE PRESSURE CELLS AND SENSITIVITY ESTIMATION METHODOLOGY

TECHNICAL FIELD OF THE INVENTION

The present invention relates generally to pressure sensors. More specifically, the present invention relates to a pressure sensor having multiple pressure cells of differing sensitivities and methodology for measuring sensitivity of the pressure sensor.

BACKGROUND OF THE INVENTION

Microelectromechanical systems (MEMS) devices are semiconductor devices with embedded mechanical components. MEMS devices include, for example, pressure sensors, accelerometers, gyroscopes, microphones, digital mirror displaces, micro fluidic devices, and so forth. MEMS devices are used in a variety of products such as automobile airbag systems, control applications in automobiles, navigation, display systems, inkjet cartridges, and so forth. Capacitive-sensing MEMS devices designs are highly desirable for operation in miniaturized devices due to their low temperature sensitivity, small size, and suitability for low cost mass production.

A microelectromechanical systems (MEMS) pressure sensor typically uses a pressure cavity and a membrane element, referred to as a diaphragm, that deflects under pressure. In some configurations, a change in the distance between two plates, where one of the two plates is the movable diaphragm, creates a variable capacitor to detect strain (or deflection) due to the applied pressure over the area. Process variation on critical design parameters, such as the width of a MEMS pressure sensor diaphragm, can affect the sensitivity of a pressure sensor. For example, a small difference in the width of a MEMS pressure sensor diaphragm can result in a large difference in sensitivity, relative to the predetermined nominal, or design, sensitivity for the pressure sensor. Accordingly, the sensitivity of each MEMS pressure sensor is typically calibrated individually. The equipment used for this calibration can be costly and difficult to maintain. Additionally, calibration can be slow due to the imposition of a physical pressure stimulus on the pressure sensor in order to calibrate the pressure sensor. Individual calibration of MEMS pressure sensors by imposing a physical pressure stimulus undesirably increases costs associated with the pressure sensor and/or can introduce error in pressure measurements.

BRIEF DESCRIPTION OF THE DRAWINGS

A more complete understanding of the present invention may be derived by referring to the detailed description and claims when considered in connection with the Figures, wherein like reference numbers refer to similar items throughout the Figures. Elements in the figures are illustrated for simplicity and clarity and have not necessarily been drawn to scale.

FIG. 5 shows a table of equations for deriving the sensitivity of a sense cell of the pressure sensor from the sensitivity of a test cell.

DETAILED DESCRIPTION

Embodiments of the present invention entail a pressure sensor and methodology for estimating the sensitivity of the MEMS pressure sensor. The pressure sensor includes multiple pressure sensor cells on a single die having different sensitivities. Sense signals from one set of the pressure sensor cells (i.e., test cells) may be utilized to estimate the sensitivity of another set of the pressure sensor cells (i.e., sense cells). These different sensitivities can be achieved by fabricating the test cells with a greater diaphragm width than the sense cells. The widths of the test and sense diaphragms can vary slightly from design specifications due to process variation. Thus, the widths of the test and sense diaphragms are only approximately known for the test and sense cells. However, the difference between the two widths is well known regardless of process variation. Knowledge of the difference in widths of the test and sense diaphragms is utilized herein to provide an estimate of the sensitivity of the sense cells relative to the test cells in order to determine the sensitivity of the pressure sensor. Such a pressure sensor and methodology can reduce test costs, provide improved feedback for process control, and enable sensitivity estimation without imposing a physical stimulus calibration signal.

Figure 1:
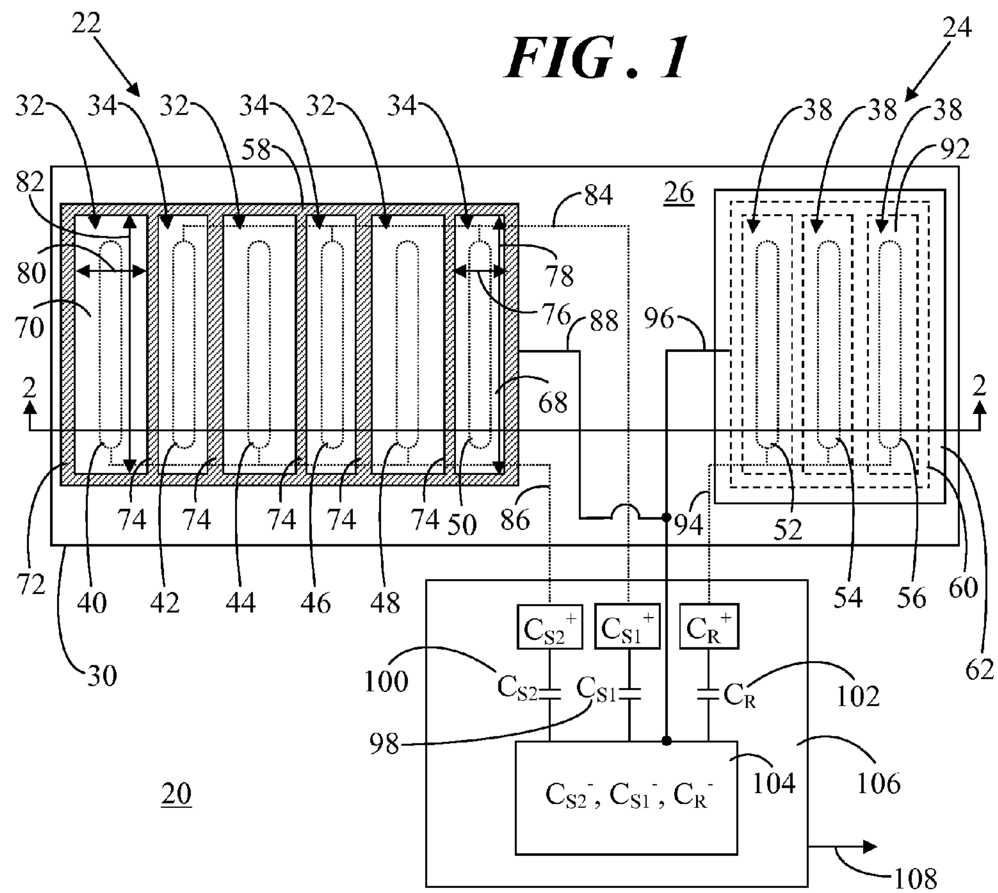
FIG. 1 shows a simplified top view of a pressure sensor in accordance with an embodiment.
Figure 2:
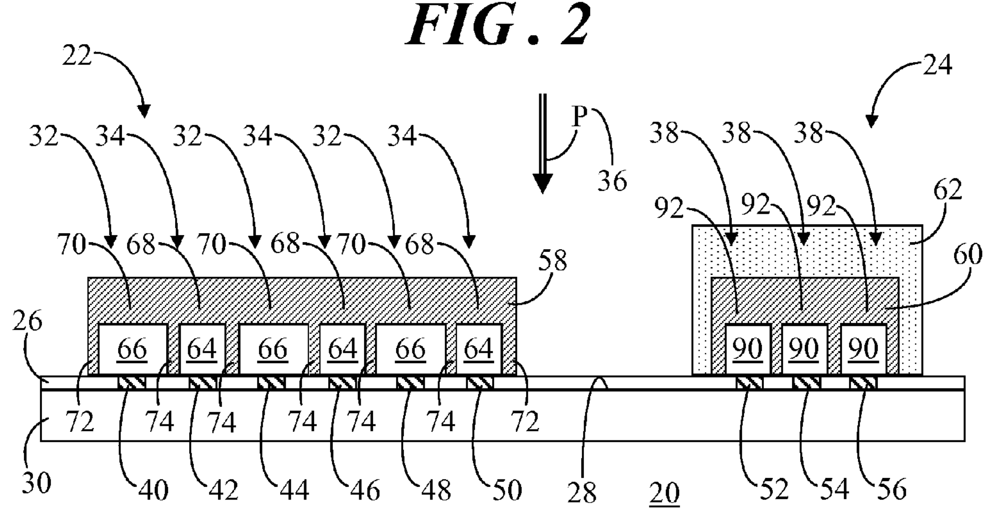
FIG. 2 shows a side sectional view of the pressure sensor along section lines 2-2 of FIG. 1.

Referring now to FIGS. 1 and 2, FIG. 1 shows a simplified top view of a MEMS pressure sensor 20 in accordance with an embodiment, and FIG. 2 shows a side sectional view of pressure sensor 20 along section lines 2-2 of FIG. 1. Pressure sensor 20 generally includes a sense structure 22 and a reference structure 24. Sense structure 22 and reference structure 24 may be fabricated on an insulating layer 26, such as a nitride layer, formed on a surface 28 of a substrate 30. Insulating layer 26 can comprise any suitable insulative or dielectric material layer selected according to the requirements of a given pressure sensor implementation.

Sense structure 22 includes sense cells 32, 34 that are configured in an interleaved arrangement, i.e., an alternating arrangement of sense cells 32 with sense cells 34. In general, individual sense cells 32, 34 of sense structure 22 are sensitive to ambient pressure 36, represented by an arrow and labeled P in FIG. 2. Reference structure 24 includes reference cells 38. Unlike sense cells 32, 34, reference cells 38 of reference structure 24 are largely insensitive to ambient pressure 36. In alternative embodiments, sense cells 32, 34 need not be interleaved, but may instead be arranged in other structural configurations.

Both sets of sense cells 32 and sense cells 34 are sufficiently sensitive to detect ambient pressure 36. However, as will be discussed in significantly greater detail in connection with FIGS. 3 and 4, sense cells 32 are implemented within pressure sensor 20 to estimate the sensitivity of sense cells 34. Once their sensitivity is estimated, sense cells 34 are used within pressure sensor 20 to detect and subsequently output a measure indicative of pressure 36. Thus, in order to distinguish them, sense cells 32 will be referred to hereinafter as test cells 32 and sense cells 34 will continue being referred to as sense cells 34.

Sense structure 22 includes electrodes 40, 42, 44, 46, 48, and 50 formed in or on insulating layer 26. Likewise, electrodes 52, 54, and 56 of reference structure 24 may be formed in or on insulating layer 26. In FIG. 1, electrodes 40, 42, 44, 46, 48, and 50 of sense structure 22 are illustrated in phantom using dotted lines, due to their location beneath a common electrode 58. Likewise, electrodes 52, 54, and 56 of reference structure 24 are also illustrated in phantom using dotted lines, due to their location beneath a common electrode 60 and a cap layer 62. FIGS. 1 and 2 are illustrated using various shading and/or hatching to distinguish the different elements produced within the structural layers of the devices, as will be discussed below. These different elements within the structural layers may be produced utilizing current and upcoming surface micromachining techniques of depositing, patterning, etching, and so forth. Accordingly, although different shading and/or hatching may be utilized in the illustrations, the different elements within the structural layers can be formed out of the same material, such as polysilicon, single crystal silicon, and the like.

Electrodes 42, 46, and 50 represent a set of sense capacitor bottom plate electrodes for sense cells 34, while electrodes 40, 44, and 48 represent another set of sense capacitor bottom plate electrodes for test cells 32. Since test cells 32 are interleaved with sense cells 34, electrodes 40, 44, and 48 are correspondingly configured in an interleaved arrangement with electrodes 42, 46, and 50. In some embodiments, a geometry of individual electrodes of the first set of electrodes 42, 46, and 50 may match a geometry (i.e., width, length, and thickness) of individual electrodes of the second set of electrodes 40, 44, and 48, i.e., the geometries are substantially similar. However, matching geometries is not a limitation.

Referring still to sense structure 22, common electrode 58 represents a capacitor top plate electrode for sense cells 34 and test cells 32 respectively. Common electrode 58 is overlying, spaced apart from, and configured in connection with electrodes 40, 42, 44, 46, 48, and 50, to produce sense cavities 64 for sense cells 34 and test cavities 66 for test cells 32. Cavities 64 and 66 are represented as separate cavities herein. However, in alternative embodiments, cavities 64 and 66 may be formed as a common cavity. Cavities 64 and 66 may be vacuum chambers or chambers filled with a suitable gas at a given controlled pressure.

Common electrode 58 anchors to the surface of insulating layer 26 for establishing portions of common electrode 58 corresponding to sense diaphragms 68 for sense cells 34 and for establishing other portions of common electrode 58 corresponding to test diaphragms 70 for test cells 32. For example, common electrode 58 anchors to the insulating layer 26 about a perimeter 72 of common electrode 58 and at desired anchor locations internal to the perimeter, such as indicated by reference numerals 74, to establish cavities 64 and 66 and to distinguish sense diaphragms 68 from test diaphragms 70.

In general, an area of each of sense diaphragms 68 is less than an area of each of test diaphragms 70. More particularly, each of sense diaphragms 68 is characterized by a width 76 and a length 78. Likewise, each of test diaphragms 70 is characterized by a width 80 and a length 82. In an embodiment, length 78 of each of sense diaphragms 68 equals length 82 of each of test diaphragms 70. However, width 80 of each of test diaphragms 70 is greater than width 76 of each of sense diaphragms 68. Since lengths 78 and 82 are equal, and width 80 of test diaphragms 70 is greater than width 76 of sense diaphragms 68, it follows that an area of each of test diaphragms 70 is greater than an area of each of sense diaphragms 68.

The greater width 80 of each of test diaphragms 70 causes test diaphragms 70 to deflect more than sense diaphragms 68 in response to pressure 36, thus resulting in a greater sensitivity of test cells 32 to pressure 36 than sense cells 34. Accordingly, in the illustrated embodiment, widths 76 and 80 are critical dimensions that directly affect the sensitivity of sense cells 22 and test cells 24, respectively. In some embodiments, width 80 may be approximately ten to twenty percent greater than width 76 so that test cells 32 are approximately twice as sensitive to pressure 36 as sense cells 34. This greater sensitivity is exploited when estimating the sensitivity of sense cells 34, as will be discussed in connection with FIGS. 3 and 4.

MEMS pressure sensor 20 further includes a conductive runner 84 electrically coupled to electrodes 42, 46, and 50 to provide electrical access external to sense cells 34 of sense structure 22. Another conductive runner 86 is electrically coupled to electrodes 40, 44, and 48 to provide electrical access external to test cells 32. Additionally a conductive runner 88 is electrically coupled to common electrode 58.

Referring now to reference structure 24 presented in FIGS. 1 and 2, electrodes 52, 54, and 56 represent a set of sense capacitor bottom plate electrodes for reference cells 38. Common electrode 60 is overlying, spaced apart from, and configured in connection with electrodes 52, 54, and 56 to produce reference cavities 90 for reference cells 38. Cavities 90 are represented as separate cavities herein. However, in alternative embodiments, cavities 90 may be formed as a common cavity. Common electrode 60 anchors to the surface of insulating layer 26 for establishing reference diaphragms 92 for reference cells 38. For example, in FIG. 1, common electrode 60 anchors to insulating layer 26 about a perimeter of common electrode 60 and at desired anchor locations internal to the perimeter, to establish cavities 90 and to distinguish reference diaphragms 92 from one another.

Cap layer 62 is formed in contact with diaphragms 92. Cap layer 62 may be a relatively thick layer of, for example, tetraethyl orthosilicate (TEOS), which makes diaphragms 92 largely insensitive to pressure. As such, diaphragms 92 may be referred to hereinafter as reference electrodes 92. A conductive runner 94 is electrically coupled to electrodes 52, 54, and 56 of reference structure 34 to provide electrical access external to sense cells 34 of sense structure 22. Another conductive runner 96 is electrically coupled to common electrode 60. It should be observed in FIG. 1 that common electrode 60 is illustrated in phantom using dashed lines, due to its location beneath cap layer 62.

In general, sense cells 34 form a capacitor between diaphragms 68 and electrodes 42, 46, and 50. That is, a sense signal, referred to herein as a sense capacitance 98, labeled $C_{S1}$, is produced between sense diaphragms 68 and electrodes 42, 46, and 50 (i.e., the difference between $C_{S1}^+$ and $C_{S1}^-$) that varies in response to pressure 36. Likewise, test cells 34 form a capacitor between diaphragms 70 and electrodes 40, 44, and 48. That is, a test signal, referred to herein as a test capacitance 100, labeled $C_{S2}$, is produced between test diaphragms 70 and electrodes 40, 44, and 48 (i.e., the difference between $C_{S2}^+$ and $C_{S2}^-$) that also varies in response to pressure 36. A distinction of MEMS pressure sensor 20 is that the sensitivity of test cells 32 producing capacitance 100 is different from the sensitivity of sense cells 34 producing sense capacitance 98. As such, test capacitance 100 may be greater than sense capacitance 98 in response to pressure 36 because width 80 of diaphragm 70 of each test cell 32 is greater than width 76 of diaphragm 68 of each sense cell 34.

Reference cells 38 also form a capacitor between each of electrodes 92 and reference electrodes 52, 54, and 56. Thus, a reference capacitance signal 102, $C_R$, is formed between electrodes 92 and reference electrodes 52, 54, and 56 (i.e., the difference between $C_R^+$ and $C_R^-$). However, reference capacitance signal 102 does not vary in response to pressure 36 due to the presence of cap layer 62. In an embodiment, conductive runner 88 for sense structure 22 and conductive runner 96 for reference structure 24 are interconnected to form a common node 104 between sense structure 22 and reference structure 44.

A control circuit 106 is configured to measure the ratio of sense capacitance signal 98 to reference capacitance signal 102 (i.e., $C_{S1}/C_R$). Higher pressure 36 increases sense capacitance 98, $C_{S1}$, but has little effect on reference capacitance 102, $C_R$. Therefore the ratio of sense capacitance 98 to reference capacitance 102 (i.e., $C_{S1}/C_R$) increases as pressure 36 increases. This value can be converted into an output signal 108, i.e., a measure indicative of pressure 36.

In the views of pressure sensor 20 shown in FIGS. 1 and 2, sense structure 22 is illustrated as having three test cells 32 and three sense cells 34. Likewise, reference structure 24 is illustrated as having three reference cells 38. However, it should be understood by those skilled in the art that pressure sensor 20 may have any suitable quantity of test, sense, and reference cells 32, 34, 38, respectively, and their associated diaphragms/electrodes. Additionally, pressure sensor 20 may include other features on substrate 30 such as shield lines, a guard ring, and so forth that are not included in FIGS. 1 and 2 for simplicity of illustration.

Pressure sensor 20 is illustrated with generally rectangular diaphragms having a width that is less than a length of the rectangular diaphragms. However, the diaphragms need not be rectangular, but may instead be other shapes (e.g., squares, circles, multi-sided elements, and so forth) with test cells 32 having greater sensitivity than sense cells 34 in order to provide sensitivity estimation.

Figure 3:
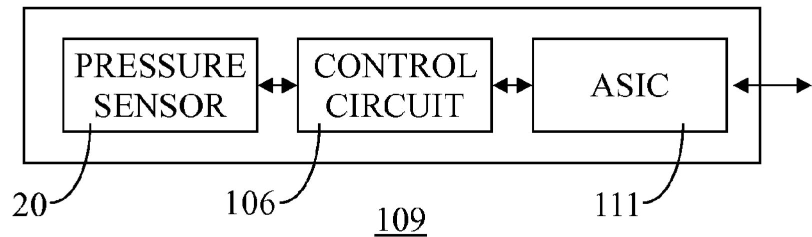
FIG. 3 shows a simplified block diagram of a pressure sensing system.

FIG. 3 shows a shows a simplified block diagram of a device 109. Device 109 includes pressure sensor 20, control circuit 106, and any other application specific integrated circuit (ASIC) 111 or ASICs 111 appropriate for the operation of device 109. Device 109 may be a pressure sensing system for an automotive application such as for airbag pressure sensing, oil pressure sensing, HVAC pressure sensing, and other various automotive pressure sensing applications. Alternatively, device 109 may be a global positioning system (GPS) unit, smartphone, tablet, sports watch, weather station, or any other industrial application in which pressure sensing may be utilized. Regardless of the particular device 109, the sensitivity of pressure sensor 20 included in device 109 can be estimated prior to or following its installation within device 109 without imposition of a physical stimulus calibration signal, and device 109 can be calibrated as needed.

Figure 4:
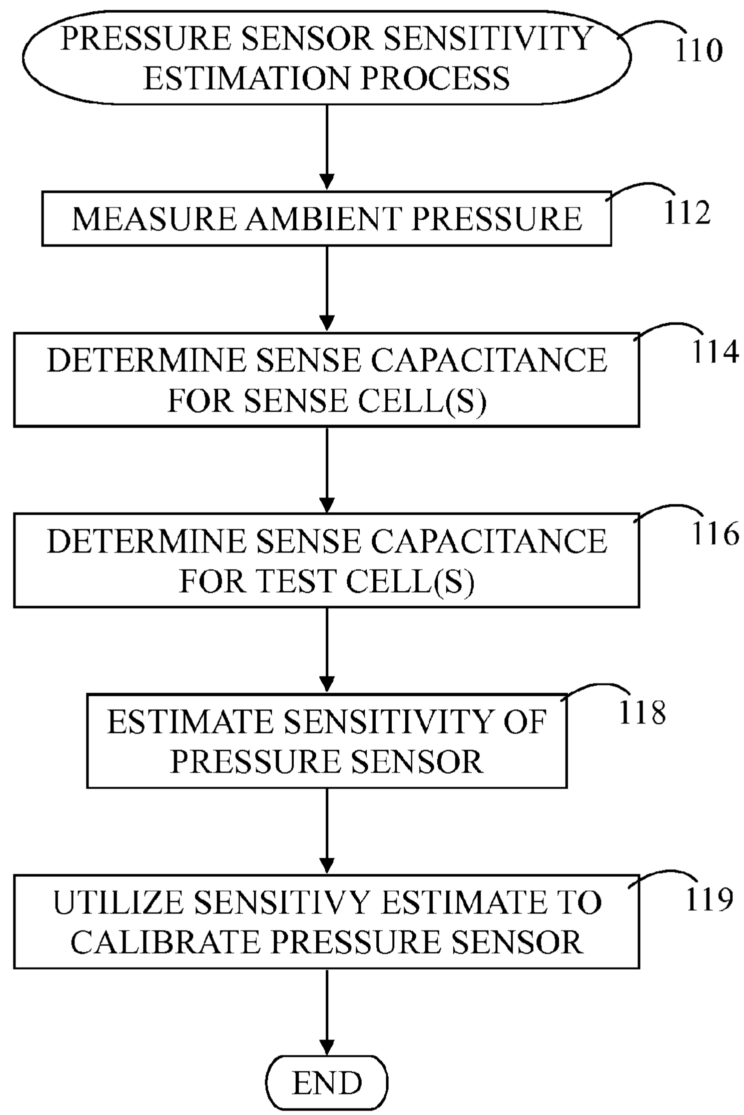
FIG. 4 shows a flowchart of a pressure sensor sensitivity estimation process in accordance with another embodiment.

FIG. 4 shows a flowchart of a pressure sensor sensitivity estimation process 110 in accordance with another embodiment. Pressure sensor sensitivity estimation process 110 is performed to estimate the sensitivity of sense cells 34 (FIG. 1) of pressure sensor 20 (FIG. 1) using the higher sensitivity test cells 32 (FIG. 1). Estimation process 110 can be performed under ambient pressure conditions, e.g., standard atmospheric pressure, without imposing a physical pressure calibration stimulus in excess of atmospheric pressure.

Estimation process 110 begins with a task 112. At task 112, ambient pressure 36 (FIG. 1) is measured in the location at which pressure sensor 20 is being tested. Pressure 36 may be measured using any suitable and highly accurate pressure measurement device.

Process 110 continues with a task 114. At task 114, sense capacitance 98 (FIG. 1) is determined for sense cells 34 (FIG. 1).

A task 116 is performed in conjunction with task 114. At task 116, test capacitance 100 is determined for test cells 32 (FIG. 1)

Sensitivity estimation process 110 continues with a task 118. At task 118, the sensitivity of pressure sensor 20 (FIG. 1), and in particular, sense cells 34 (FIG. 1) is estimated using sense capacitance 98 and test capacitance 100. The details of estimation task 118 are discussed in connection with FIG. 5.

Following task 118, a task 119 may be performed. At task 119, the results obtained from estimation task 118 may be utilized to calibrate or otherwise trim pressure sensor 20 in accordance with known methodologies. Accordingly, following task 119, pressure sensor sensitivity estimation process 110 ends.

FIG. 5 shows a set 120 of equations for deriving the sensitivity of pressure sensor 20, and particularly, for estimating the sensitivity of sense cells 34 (FIG. 1) of sense structure 22 (FIG. 1) utilizing the higher sensitivity test cells 32. Set 120 reveals that a relationship can be established between sensitivity and the geometry of a pressure sensing cell, e.g., sense cell 34 and test cell 32. Three parameters have a strong effect on the sensitivity of a pressure sensing cell. As shown in the provided figure of an exemplary pressure sensing cell 122, these parameters include a width 124, W, of a diaphragm 126 of pressure cell 122, a depth 128, D, of a cavity 130 underlying diaphragm 126, and a thickness 132, T, of diaphragm 126. Accordingly, a diaphragm sensitivity 133, SENS, can be expressed as a function of width 124, depth 128, and thickness 132 as represented by a generalized functional equation 134.

Therefore, an equation 136 represents a value of a sensitivity 138, $SENS_1$, of sense cells 34 (FIG. 1) of sense structure 22 (FIG. 1) having width 76 of sense diaphragms 68 (FIG. 2), depth 128 of cavities 64 (FIG. 2), and thickness 132 of diaphragms 68. Likewise, an equation 140 represents a value of a sensitivity 142, $SENS_2$, of test cells 32 (FIG. 1) of sense structure 22 having width 80 of test diaphragms 70 (FIG. 2), depth 128 of cavities 66 (FIG. 2), and thickness 132 of diaphragms 70, where width 80 is greater than width 76 by a value represented by ω.

Given the relationship between sensitivity and the geometry of a pressure sensing cell, set 120 further reveals that the value of sensitivity 138 of sense cells 34 (FIG. 1) can be derived relative to the value of sensitivity 142 of test cells 32 (FIG. 1). Rearranging the terms of equation 140 yields an equation 144, and substituting the appropriate terms of equation 144 into equation 138 yields an equation 146 in which sensitivity 138 of sense cells 34 is a function of sensitivity 142 of test cells 32, as well as, diaphragm widths 76 and 80. Rearranging the terms of equation 146 yields a sensitivity equation 148 for sense cells 34 in which sensitivity 138 is a function of sensitivity 142 of test cells 32 and a ratio of diaphragm width 76 to diaphragm width 80. Thus, sensitivity 138 is related to sensitivity 142 by two parameters. These parameters include width 76 of sense diaphragms 68 (FIG. 2) of sense cells 34 (FIG. 2) and the difference, ω, between diaphragm width 80 and diaphragm width 76. Width 76 is known approximately, but not exactly since width 76 may vary from its design width due to some process variations, e.g., over or under etch. This difference, ω, is well known since this is the difference between diaphragm widths 80 and 76, regardless of process variation resulting in some over or under etch.

As further shown in set 120, sense capacitance 98 can be defined as a function of sensitivity 138, ambient pressure 36, and zero pressure offset, $ZPO_1$, represented by a capacitance equation 150. Likewise, test capacitance 100 can be defined as a function of sensitivity 142, ambient pressure 36, and zero pressure offset, $ZPO_2$, as represented by a capacitance equation 152. Zero pressure offset is the theoretical output of pressure sensor 20 at zero pressure. Due to their structural configuration, it can be assumed that the zero pressure offset, $ZPO_2$, for test cells 32 is equal to the zero pressure offset, $ZPO_1$, for sense cells 34.

Accordingly, with $ZPO_2=ZPO_1$, capacitance equations 150 and 152 can be combined and rearranged to derive a sensitivity equation 154 for test cells 34, where sensitivity 142 is shown to be a function of sense capacitance 98, test capacitance 100, sensitivity 138 of sense cells 34, and pressure 36.

Sensitivity equation 154 for test cells 32 can be combined with sensitivity equation 148 for sense cells 34 to yield another equation 156. Equation 156 can be mathematically rearranged as represented by a sensitivity equation 158 in order to derive sensitivity 138 of sense cells 34. Accordingly, sensitivity 138 can be shown to be a function of width 76 (approximately known), the difference, ω, between width 80 and width 76 (exactly known), sense capacitance 98 at pressure 36 (measured), test capacitance 100 at pressure 36 (measured), and pressure 36 (measured). Thus, through the execution of pressure sensor sensitivity estimation process 110, the estimated sensitivity 138 of sense cells 34 of pressure sensor 20 can be determined utilizing parameters derived from the higher sensitivity test cells 32.

Exemplary equation 158 is provided herein for illustrative purposes. In practice, however, there may be deviations from the ideal that may call for the inclusion of scaling constants and/or other terms, not shown for simplicity of illustration. Some additional terms may be added to compensate for higher order effects that are not in the theoretical models.

It is to be understood that certain ones of the process blocks depicted in FIG. 4 may be performed in parallel with each other or with performing other processes. In addition, it is to be understood that the particular ordering of the process blocks depicted in FIG. 4 may be modified, while achieving substantially the same result. Accordingly, such modifications are intended to be included within the scope of the inventive subject matter. In addition, although particular system configurations are described in conjunction with FIGS. 1-2, above, embodiments may be implemented in systems having other architectures, as well. These and other variations are intended to be included within the scope of the inventive subject matter.

An embodiment of a pressure sensor comprises a sense cell having a first electrode formed on a substrate and a sense diaphragm overlying and spaced apart from the first electrode to produce a sense cavity. The pressure sensor further comprises a test cell having a second electrode formed on the substrate and a test diaphragm overlying and spaced apart from the second electrode to produce a test cavity. Each of the sense cell and the test cell are sensitive to pressure, and a first area of the sense diaphragm is less than a second area of the test diaphragm.

An embodiment of a method of determining a sensitivity of a pressure sensor comprises measuring an ambient pressure, determining a first sense signal between a first electrode and a sense diaphragm of a sense cell of the pressure sensor at the ambient pressure, and determining a second sense signal between a second electrode and a test diaphragm of a test cell at the ambient pressure. The sensitivity of the sense cell is estimated using the measured ambient pressure, and the first and second sense signals.

The embodiments of a MEMS pressure sensor and a method of estimating the sensitivity of the MEMS pressure sensor. The pressure sensor includes multiple pressure sensor structures having different sensitivities formed on a single die. Atmospheric pressure (approximately 100 kPa) is sufficient to deflect each diaphragm differently. Each pressure sensor can thus have a different sense signal at atmospheric pressure. The sense signals from a higher sensitivity set of the pressure sensor structures may be utilized to estimate the sensitivity of another set of the pressure sensor structures. Such a pressure sensor and methodology can reduce test costs, provide improved feedback for process control, and enable sensitivity estimation without imposing a physical stimulus calibration signal.

While the principles of the inventive subject matter have been described above in connection with specific apparatus and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently so that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A device comprising:

a pressure sensor, said pressure sensor including:

a sense cell having a first electrode formed on a substrate and a sense diaphragm overlying and spaced apart from said first electrode to produce a sense cavity, said sense cell being configured to produce a first sense signal in response to pressure;

a test cell having a second electrode formed on said substrate and a test diaphragm overlying and spaced apart from said second electrode to produce a test cavity, said test cell being configured to produce a second sense signal in response to said pressure, wherein a first sensitivity of said sense cell to said pressure is less than a second sensitivity of said test cell to said pressure and a value of said second sensitivity is utilized to estimate a value of said first sensitivity; and a reference cell, said reference cell including a third electrode formed on said substrate, a reference diaphragm overlying and spaced apart from said third electrode to produce a reference cavity, and a cap layer over said reference diaphragm, said cap layer making said reference cell insensitive to said pressure.

2. The device in claim 1 wherein said pressure sensor further comprises a common electrode overlying and spaced apart from said first and second electrodes, said common electrode including said sense diaphragm and said test diaphragm.

3. The device in claim 1 wherein said pressure sensor further comprises:

a set of sense cells formed on said substrate, said set of sense cells including said sense cell; and a set of test cells formed on said substrate, said set of test cells including said test cell, wherein said set of test cells is configured in an interleaved arrangement with said set of sense cells.

4. The device in claim 1 wherein:

said sense diaphragm is characterized by a first width; and said test diaphragm is characterized by a second width, said second width being greater than said first width.

5. The device in claim 1 wherein said test cell is utilized to estimate said first sensitivity of said sense cell to said pressure without application of a pressure stimulus that is greater than atmospheric pressure.

* * * * *